(12) United States Patent
Chen et al.

(10) Patent No.: US 8,559,501 B2
(45) Date of Patent: Oct. 15, 2013

(54) METHOD AND APPARATUS FOR ADAPTIVELY DETERMINING A BIT BUDGET FOR ENCODING VIDEO PICTURES

(75) Inventors: Qu Qing Chen, Beijing (CN); Zhi Bo Chen, Beijing (CN); Xiao Dong Gu, Beijing (CN)

(73) Assignee: Thomson Licensing (FR)

( * ) Notice: Subject to any disclaimer, the term of this patent is extended or adjusted under 35 U.S.C. 154(b) by 1111 days.

(21) Appl. No.: 12/308,136

(22) PCT Filed: Jun. 9, 2006

(86) PCT No.: PCT/CN2006/001260
§ 371 (c)(1),
(2), (4) Date: Dec. 8, 2008

(87) PCT Pub. No.: WO2007/143876
PCT Pub. Date: Dec. 21, 2007

(65) Prior Publication Data
US 2009/0279603 A1 Nov. 12, 2009

(51) Int. Cl.
*H04N 7/12* (2006.01)

(52) U.S. Cl.
USPC ............ 375/240.02; 375/240.01; 375/240.08; 375/240.12; 375/240.13; 375/240.24; 375/240.26

(58) Field of Classification Search
USPC ............ 375/240.01, 240.02, 240.08, 240.12, 375/240.13, 240.24, 240.26
See application file for complete search history.

(56) References Cited

U.S. PATENT DOCUMENTS

| | | | |
|---|---|---|---|
| 6,125,147 A * | 9/2000 | Florencio et al. | ........ 375/240.29 |
| 6,876,705 B2 | 4/2005 | Katsavounidis et al. | |
| 6,914,939 B1 | 7/2005 | Boice et al. | |
| 7,542,613 B2 | 6/2009 | Fujiyama et al. | |
| 2002/0122482 A1 | 9/2002 | Kim et al. | |
| 2005/0008075 A1 | 1/2005 | Chang | |
| 2006/0078051 A1 | 4/2006 | Liang et al. | |
| 2007/0053430 A1 | 3/2007 | Tahira | |

FOREIGN PATENT DOCUMENTS

| | | |
|---|---|---|
| CN | 1502207 | 6/2004 |
| EP | 0645930 | 3/1995 |
| EP | 1225769 | 7/2002 |
| JP | 2004532540 | 10/2004 |

(Continued)

OTHER PUBLICATIONS

Search Report Dated Oct. 20, 2006.

(Continued)

*Primary Examiner* — Geepy Pe
(74) *Attorney, Agent, or Firm* — Jack Schwartz and Associates, PLLC

(57) ABSTRACT

When for video coding Intra refresh is used, which inserts Intra coded blocks into previously Inter coded pictures, an efficiently adapted rate control method is required for error resilient video coding. A method for adaptively determining a bit budget for encoding video pictures comprises pre-analyzing each of the pictures of a group of pictures, wherein a relative complexity index is calculated for each picture, allocating bits to the pictures based on their relative complexity index and encoding each of the pictures with the allocated number of bits. The pre-analysis comprises selecting pictures for Intra refresh coding, extracting attention area information from the selected pictures, encoding at least the macroblocks of the attention area using Intra mode, calculating for each picture a complexity index, and calculating from the complexity indices of the pictures of the group a relative complexity index for each picture. Thus, a subjectively better video quality is achieved.

15 Claims, 2 Drawing Sheets

(56) References Cited

FOREIGN PATENT DOCUMENTS

| JP | 2006101075 | 4/2013 |
|---|---|---|
| WO | WO9938314 | 7/1999 |
| WO | WO 99/52297 | 10/1999 |
| WO | WO2005125215 | 12/2005 |

OTHER PUBLICATIONS

Baccichet, P. et al., "Network-Aware H.264/AVC Region-of-Interest Coding for a Multi-Camera Wireless Surveillance Network", Proc. Picture Coding Symposium (PCS'06), Beijing, China, Apr. 2006.

Baccichet, P. et al., "Systematic Lossy Error Protection based on H.264/AVC Redundant Slices and Flexible Macroblock Ordering", Proc. Packet Video Workshop (PV-2006), Hangzhou, China, Apr. 2006.

Itti et al., "A Model of Saliency-Based Visual Attention for Rapid Scene Analysis", IEEE Transactions on Pattern Analysis and Machine Intelligence, vol. 20, No. 11, Los Alamitos, CA, Nov. 1, 1998, pp. 1254-1259.

Milanese et al., "Attentive Mechanism for Dynamic and Static Scene Analysis", Optical Engineering, Soc. of Photo-Optical instrumentation Engineers, vol. 34, No. 8, Bellingham, Aug. 1, 1995, pp. 2428-2433.

Yin et al., "Fast mode Decision and Motion Estimation for JVT/H.264", Proceedings 2003 International Conference on Image Processing, vol. 3, Barcelona, Spain, Sep. 14-17, 2003, pp. 853-856.

Chen et al., "Attention Based Adaptive Intra Refresh for Error Resilient Video Coding", Proceedings of Int. Picture Coding Symposius, Apr. 2006.

Yokoyama et al., "A Rate Contra; Method with pre-anaiysis for Real-Time MPEG-2 Video Coding", Proceedings 2001 International Conference on Image Processing, ICIP 2001, Thessaloniki, Greece, vol. 3, Oct. 7-10, 2001, pp. 514-517.

* cited by examiner

METHOD AND APPARATUS FOR ADAPTIVELY DETERMINING A BIT BUDGET FOR ENCODING VIDEO PICTURES

This application claims the benefit, under 35 U.S.C. §365 of International Application PCT/CN2006/001260, filed Jun. 9, 2006, which was published in accordance with PCT Article 21(2) on Dec. 21, 2007 in English.

FIELD OF THE INVENTION

This invention relates to a method and an apparatus for adaptively determining a bit budget for encoding video pictures.

BACKGROUND

In the existing block based video coding methods, there are basically two types of coding modes: Intra mode and Inter mode. Intra mode only uses the information within a current picture, while Inter mode can use the information in other pictures (forward or backward) as reference.

When encoded video is transmitted over error prone network, errors happened in one picture will propagate to the subsequent pictures when Inter mode is used due to the prediction of Inter mode, while coding in Intra mode can suppress error propagation very well since it does not refer to former data. Therefore, forced Intra coding, also called Intra refresh, is one of the most fundamental and useful tools for error resilient video coding. It may quickly recover video subjective quality. But encoding the whole picture in Intra mode (I-picture) produces a large amount of bits which will cause rate fluctuation. In the hybrid video coding framework many other Intra refresh methods have been proposed, which refresh only a part of a picture to be Intra mode by some special rules.

Most of the existing Intra refresh methods use random refresh, periodical refresh, motion information based refresh, Rate Distortion (RD) model based refresh, packet loss rate (PLR) based refresh, feedback based refresh, or a combination of these methods.

P. Haskell and D. Messerschmitt "Resynchronization of motion compensated video affected by ATM cell loss", ICASSP-92, March 1992, proposed that blocks with most rapid changes should be Intra refreshed most often, using the periodical random Intra refresh and motion information based conditional Intra refresh. MPEG-4 adopted this idea as Adaptive Intra refresh (AIR), with calculating the sum of absolute difference (SAD) of co-located blocks in consecutive pictures to know whether the block is in the motion area. In G. Cote, F. Kossentini "Optimal intra coding of blocks for robust video communication over the Internet" Image Commun. September 1999, an end-to-end RD model based intra refresh was proposed, wherein the error concealment is considered and the estimated end-to-end distortion as well as assumed PLR is combined into the RD optimization criterion. Based on this, Y. Zhang, W. Gao, H. Sun et al, "Error Resilient video coding in H.264 Encoder with Potential Distortion Tracking," IEEE International Conference on Image Processing, October 2004, described a simple and efficient RD model using the block-based distortion map to simulate the potential error propagation.

Other methods have also been proposed, such as isolated region based intra refresh in Y. Wang, M. Hannuksela, M. Gabbouj: "Error-robust inter/intra macroblock mode selection using isolated regions," Proceedings of 13th Packet Video Workshop, April 2003, which introduces a gradually growing region named isolated region, and the prediction area for the blocks in the isolated region is restricted.

Different from the above intra refresh methods, the European patent application EP05300975 proposes an attention-based adaptive Intra refresh for error resilient video coding, which takes subjective human vision property into account, so that a much better subjective quality is achieved than with former Intra refresh methods under the same bit rate and packet loss conditions. The flowchart of attention-based Intra refresh is shown in FIG. 1. An attention area extractor 11 extracts attention area information 14 and provides it to an Intra refresh controller 12, which sets the blocks in the attention area to be encoded 13 with higher priority in intra mode.

However, one important problem not considered in all these former Intra refresh methods, which limited their usage in real application systems, is that there is no rate control scheme available especially for Intra refresh. On one side, all the Intra refresh schemes are originally designed for error resilience and are studied with constant quantization parameters (QP) which makes it hard to achieve an appointed bit rate and can not prevent buffer overflow and underflow. But in real application systems, a certain bit rate is required and rate control has to be developed to control the buffer fullness and to obtain a fluent video quality.

On the other side, because of the different properties of Intra coding and Inter coding, Intra refresh changes the rate distortion model a lot, which is a key factor for rate control. For example, Intra coding will generate much more bits than Inter coding under the same QPs. If the same bit amount is allocated to Intra coding as to Inter coding, the subjective quality of Intra coding will be heavily degraded. Therefore the common bit allocation method in rate control, which evenly allocates bits to each Inter picture, causes a drastic fluctuation in subjective quality when used with Intra refresh. Accordingly, a more appropriate rate control method is needed for Intra refresh in error resilient video coding.

Rate control for video coding can usually be classified into GOP (group of pictures) layer, picture layer (frame or field), slice layer and macroblock (MB) layer. In each case, the rate control framework mainly has the two steps of bit allocation, wherein a certain amount of bits is allocated to the processed unit as target bits according to some criteria, and QPs decision, wherein proper quantization parameters are computed by some schemes to encode the unit with the allocated target bits. Most of the studies on rate control were done on the second step, and various rate distortion models have been proposed to illuminate the relationship among rate, distortion and QP. Examples are the linear rate-distortion model in TM5 for MPEG-2, quadratic rate-distortion model in TMN8 for H.263 and VM8 for MPEG-4.

Also taking the attention model and subjective quality into account, the European patent application EP06300184 proposed a content-based distortion-driven bit allocation scheme, which provides a reasonable bit allocation method for different attention areas within a picture and achieves a much better subjective quality within each picture.

Although rate control has been long investigated for video coding, only traditional video sequence IPPP . . . or IBBPB-BP . . . structures have been considered. However, when Intra refresh is introduced, many Intra coded blocks are inserted in the previously Inter coded picture (P- or B-picture), and the RD model changes due to the different properties of Intra coding and Inter coding. So the existing rate control methods do not work well for error resilient video coding with Intra refresh. Furthermore, the location and proportion of Intra refreshed blocks are usually variable and depend on video content and Intra refresh schemes. This increases the difficulty of rate control.

For these reasons, many effective Intra refresh methods are restricted and may not well be used in real applications.

SUMMARY OF THE INVENTION

A problem to be solved by the present invention is to provide an effective rate control method for encoding video data, wherein the encoding may use Intra refresh mode for blocks or MBs. One aspect to be considered is that usually the location and proportion of Intra refreshed blocks/MBs are variable.

According to the invention, a method for adaptively determining a bit budget for encoding video pictures comprises pre-analyzing each of the pictures of a group of pictures, wherein a relative complexity index is calculated for each picture, allocating bits to the pictures based on their relative complexity index and encoding each of the pictures with the allocated number of bits.

The pre-analysis comprises selecting pictures for Intra refresh coding, extracting attention area information form the selected pictures, encoding at least the macroblocks of the attention area using Intra mode, calculating for each picture a complexity index, and calculating from the complexity indices of the pictures of the group a relative complexity index for each picture.

According to one aspect of the invention, a method for adaptively determining a bit budget for encoding of video pictures comprises the steps of
selecting a group of pictures (e.g. a GOP), selecting a bit budget for the selected group of pictures, pro-analyzing each of the pictures, wherein for each of the pictures a predicted residual in the frequency domain is generated, allocating bits to the pictures based on the result of the pre-analysis, and encoding each of the pictures with the allocated number of bits,
wherein the step of pre-analyzing comprises the sub-steps of
determining whether or not Intra refresh is used for a picture, wherein Intra refresh means forced intra coding of specified picture portions,
extracting attention area information on block or MB level for each of the pictures that use Intra refresh,
generating based on said extracted attention area information at least for each selected picture an Intra refresh map that indicates for each block or MB whether it will be Inter or Intra coded, wherein for blocks/MBs in attention areas Intra coding is indicated,
generating for each picture a predicted residual, wherein according to the Intra refresh map the blocks/MBs within the attention area of a selected picture are Intra predicted,
performing a discrete cosine transformation (DCT) and a quantization with a constant quantization parameter,
calculating for each of the pictures a complexity index in the frequency domain,
calculating a complexity proportion of each picture based on the complexity indices of the respective picture and of the group of pictures, and
allocating to each picture an amount of bits according to its complexity proportion and the bit budget of the group.

The complexity index may be a value that corresponds to the number of bits after said quantization. The complexity proportion of a particular picture may be the complexity of the picture relative to the total complexity of the group, or the proportion of the complexity index of the picture relative to the sum of the complexity indices of the respective group of pictures.

In said step of generating a predicted residual for each picture according to the Intra refresh map, the blocks/MBs outside the attention area of a selected picture may use a conventional mode decision process. Thus, in one embodiment an Intra refresh map is generated for each picture, but attention area extraction is performed only for some (e.g. every few) pictures; for those pictures for which the attention area is extracted, the blocks/MBs in the attention area are defined to be encoded in Intra mode in the Intra refresh map, and for the other pictures the Intra refresh map defines that all the blocks in the picture should be encoded in Inter mode. Still the Intra refresh map can further be modified by some other information, as long as the forced Intra coded blocks/MBs of the attention area are not changed.

In said determining whether or not Intra refresh is used for a picture, periodically every $N^{th}$ picture may be determined for using Intra refresh. N may be constant (e.g. N=4,N=8), or depend adaptively on channel quality information, with N increasing if channel quality is better. N may also depend on a required video frame rate.

According to one aspect of the invention, an apparatus for adaptively determining a bit budget for encoding of video pictures comprises
means for selecting a group of pictures,
means for selecting a bit budget for the selected group of pictures,
means for pre-analyzing each of the pictures, wherein for each of the pictures a predicted residual in the frequency domain is generated,
means for allocating bits to the pictures based on the result of the pre-analysis, and
means for encoding each of the pictures with the allocated number of bits,
wherein the means for pre-analyzing each of the pictures comprises
means for determining whether or not Intra refresh is used for a picture (wherein Intra refresh means forced intra coding of specified picture portions),
means for extracting attention area information on block/MB level for each of the pictures that use Intra refresh,
means for generating at least for each selected picture an Intra refresh map based on said extracted attention area information, the Intra refresh map indicating for each block or MB whether it will be Inter or Intra coded,
wherein for blocks/MBs in attention areas Intra coding is indicated,
means for generating for each picture a predicted residual, wherein according to the Intra refresh map the blocks/MBs within the attention area of a selected picture are Intra predicted, means for performing a DCT, means for performing a quantization with a constant quantization parameter,
means for calculating for each of the pictures a complexity index in the frequency domain,
means for calculating a complexity proportion of each picture based on the complexity indices of the respective picture and of the group of pictures, and
means for allocating to each picture an amount of bits according to its complexity proportion and the bit budget of the group.

Advantageously, the present invention provides a simple rate control method that is usable with an adaptive (e.g. attention-based Intra refresh mode for error resilient video coding.

A particular advantage is that a more constant and therefore subjectively better quality within a group of pictures is achieved.

The proposed method can be generalized to work also for other intra refresh methods, and for the rate control for a group of pictures that contain different coding modes, be it on picture level (I-, P-, B-frames), frame level (Intra or Inter coded) or prediction level (bi-directional, forward, backward).

Though the invention will usually be used on the MB level, it can in principle also be used on block level.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a conventional encoder with attention-area based intra refresh, FIG. 2 bits proportion of each picture of a group of pictures under different QPs, FIG. 3 an overview of rate control with pre-analysis, and FIG. 4 details of the pre-analysis module.

DETAILED DESCRIPTION OF THE INVENTION

Figure 1:
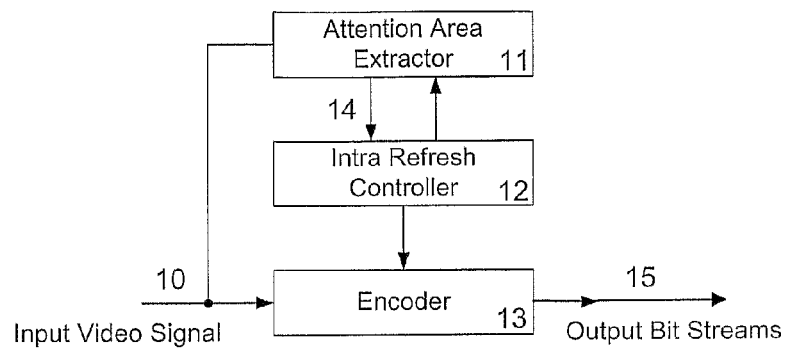

FIG. 1 shows a conventional encoder with attention-area based intra refresh, as described above. Rate control is not considered due to the Intra refresh areas being locally and temporally variable, and thus difficult to predict. It has been observed that a coded bit stream with steady quantization steps in a series of consecutive pictures in a shot will provide a relatively smooth quality. Thus, a proper steady quantization step has to be found, which can generate the target bit rate in a group of pictures. However, when the quantization step is nearly constant, the generated bit rate is not constant for each picture, and hence it is better not to allocate the sane number of bits to each picture in the group.

Figure 2:
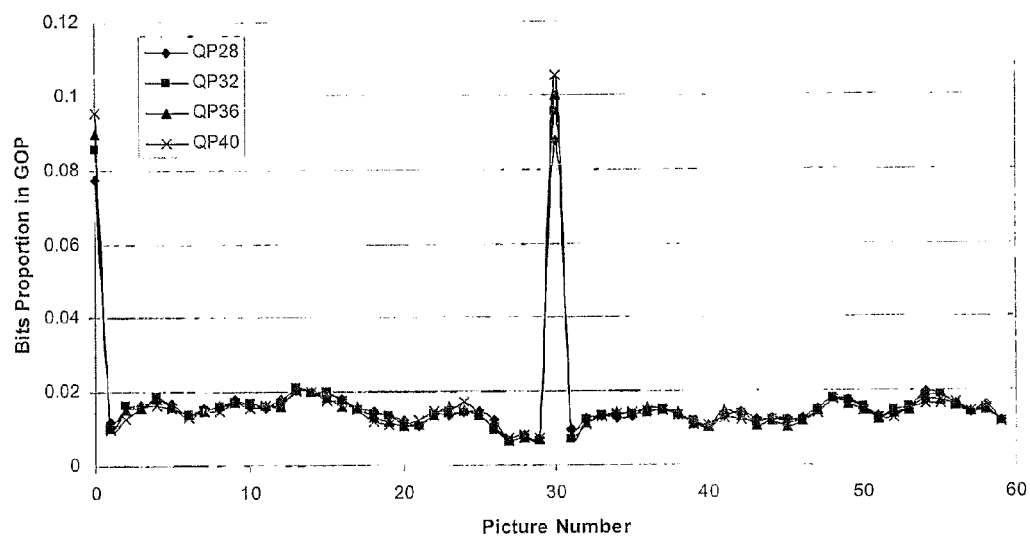

However, it has been found that when coding with different constant quantization parameters (QPs) which reflects different bit rate, the bits proportion of each picture is almost the same, as shown in FIG. 2 for the well-known "foreman" sequence being encoded with different QPs. The considered group is a GOP with a length of thirty pictures. The y-coordinate is the bits proportion of each picture in the corresponding GOP. It is clear that although the bit rates of the four curves (corresponding to different QPs) are very different, the proportion of each, picture is quite similar. This is because the proportion of bits depends on an internal property of each picture being the relative complexity of each picture in the group. Thus, the invention uses the notion that the bits proportion of a pre-analyzed picture within a defined group of pre-analyzed pictures can be taken as a measure for allocating bits for actually encoding the picture.

In particular, the invention comprises allocating bits to each picture according to its relative complexity information, which is reflected by the relative amount of data required for the picture after a simple pre-analysis process in the frequency domain and preliminary quantization under constant QP to estimate the complexity.

Figure 3:
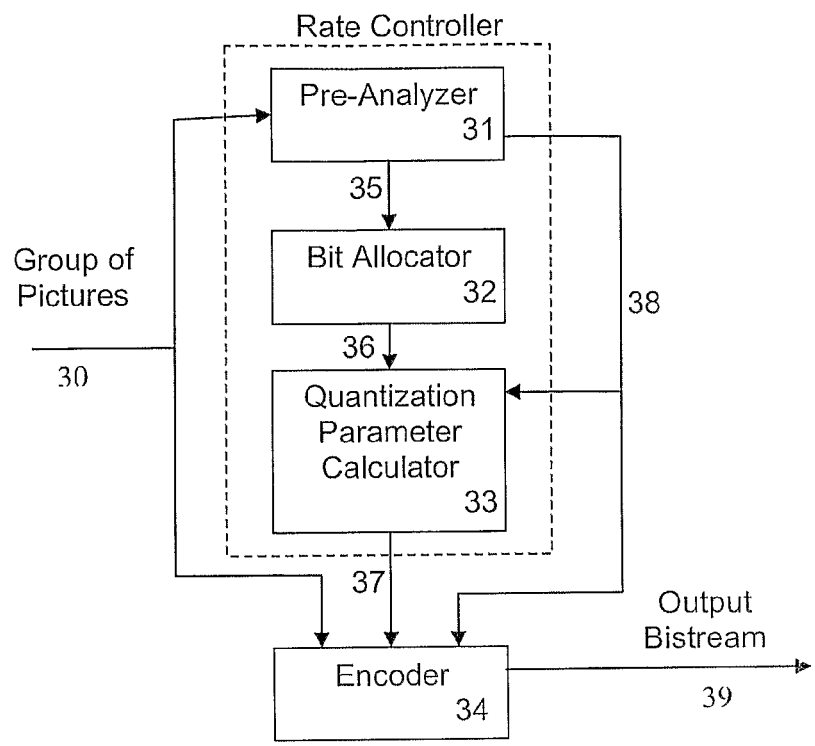
Figure 4:
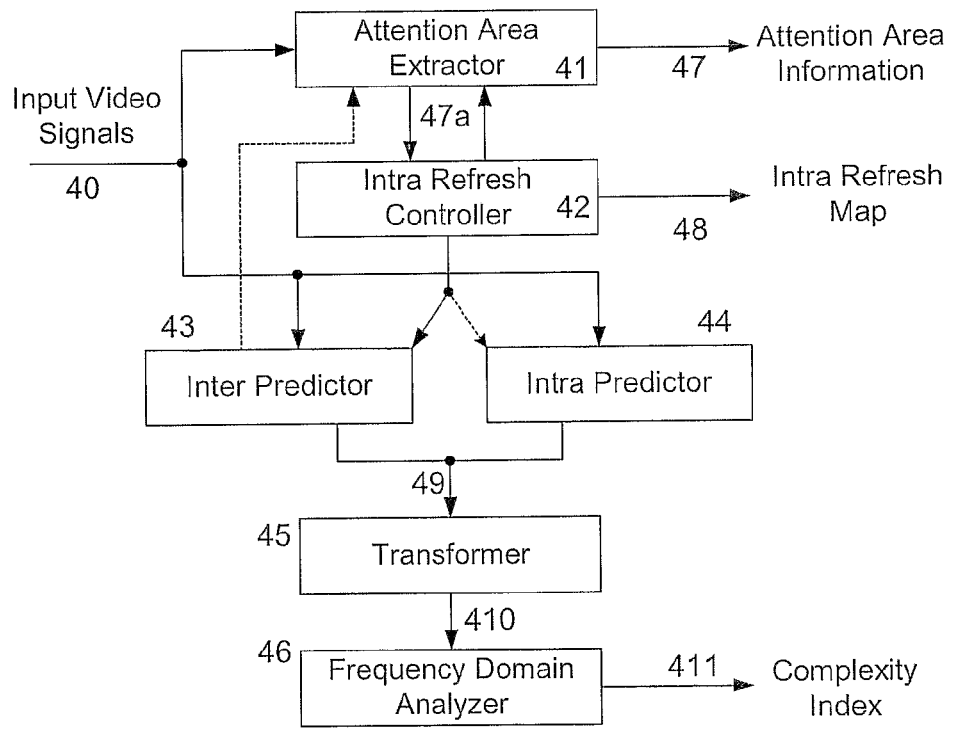

A flowchart of the method for adaptively determining a bit budget for encoding video pictures according to the invention is shown in FIG. 3 and FIG. 4. FIG. 3 provides an overview of the rate control steps, and FIG. 4 gives more details on the pre-analysis module shown in FIG. 3. As in former rate control schemes, the proposed method has the two steps of bit allocation and QP decision. Differently, the picture level bit allocation depends on the output parameters 35, 38 of a pre-analysis module 31. The pre-analysis module 31 conducts not only the attention area extraction 41 and Intra refresh decision 42, but also a frequency domain complexity analysis 46.

In detail, methods and functions of each module are described in the following.

In a first step in FIG. 3, a pre-analysis 31 is performed. A group of consecutive pictures 30 are first input to the pre-analysis module 31 before encoding the first picture. Thus, the pre-analysis module 31 may contain a buffer (not shown) for storing the group of pictures. For each picture 40, the pre-analysis module 31 makes the intra refresh decision and outputs an Intra refresh map 48. The Intra refresh map 48 shows for each MB whether Intra or Inter coding mode shall be used later for quantization parameter selection in the encoding process. According to the Intra refresh decision, the pre-analysis module 31 also performs simple Intra prediction 43 or Inter prediction 44, simple transformation 45 (e.g. simplified DCT) and frequency domain analysis 46, and finally outputs a complexity index 35 of each picture to the bit allocator 32.

FIG. 4 shows more details of the pre-analysis module 31. It comprises an attention area extractor module 41, an Intra refresh controller module 42, Intra/Inter predictor modules 43,44, a transformer module 43 and a frequency domain analyzer module 46. The Intra refresh controller 42 selects some of the pictures according to a relatively simple algorithm, e.g. every $N^{th}$ picture in the GOP. N may be constant, but it may also be variable, e.g. according to channel quality and/or video frame rate, and in a range e.g. between 2 and GOPSize/2. These pictures will then be (partially, namely in at least their attention area) Intra refreshed. The Intra refresh controller 42 notifies the attention area extractor 41 to extract the attention area from the selected pictures. The attention area extractor 41 picks out the attention area from a picture by using e.g. the information of motion, intensity, colour, residual, texture and/or temporal coherence, and provides the attention area information 47 (e.g. a list of MBs belonging to the attention area) at least to the Intra refresh controller 42. However, it may provide the attention area information 47 also to other modules outside the pre-analyzer 31, e.g. the quantization parameter calculator 33 and/or the encoder 34.

In a next step, the Intra refresh controller 42 generates an attention-based Intra refresh map 48 for each selected picture, based on the attention area information 47. Practically, the Intra refresh controller 42 can make Intra mode decisions by the required frame rate, information fed from the network (e.g. quality information), the visual attention information, etc. However, according to the invention, it always marks attention area MBs in the selected pictures for Intra coding.

The Intra refresh map 48 tells for each MB whether to use the Inter predictor 43 or Intra predictor 44 to get the predicted residual 49. If the Intra refresh map 48 indicates the coding mode to be "Inter", then the Inter predictor 43 conducts fast motion estimation and generates a temporally predicted residual. If the Intra refresh map 48 indicates the coding mode to be "Intra", then the Intra predictor 44 conducts a simplified Intra prediction and generates a spatially predicted residual.

After that, the transformer 45 performs transformation on the respectively predicted residual 49, and generates the frequency domain residual 410. The fast motion estimation within the Inter prediction module 43 can further improve the result of attention area extraction by temporal smoothing, i.e.

projection of attention areas between pictures using motion vectors, as disclosed in the European Patent Application EP05300974.

The frequency domain analyzer 46 performs a (simplified) quantization and outputs a complexity index 411 for each MB. Then all the complexity indices 411 of the MBs are accumulated (not shown) to get a complexity index on picture level 35. The quantization step used by the frequency domain analyzer 46 can be constant for all MBs/blocks and pictures, or adjusted by the Intra or Inter-mode. E.g. the quantization step for Intra node can be a little smaller than that for Inter mode, so that a somewhat higher quality that is achieved for Intra coding can benefit the later prediction. The complexity index 411 can be the actual number of coded bits, or an estimated number of coded bits (e.g. using the method described by Quqing Chen and Yun He in. "A Fast Bit Estimation Method for Rate-Distortion Optimization in H.264/AVC", Picture Coding Symposium 2005), or it can be the number of non-zero coefficients after quantization (since the number of coded bits is linear with the percentage of zero coefficients after quantization). The complexity index 411 can also contain other values which indicate the complexity of each MB/block. The absolute value of the complexity index 411,35 (and thus the format in which it is output) is not so relevant, because it is only used to obtain the complexity proportion of each picture.

The second step is bit allocation 32. After pre-analysis 31 for a group of pictures, the complexity 35 of each picture can be obtained. Suppose there are N input pictures in the group, and the output complexities of each picture are $C_1, C_2, \ldots, C_N$. The total number of bits to be allocated to all the group of pictures is $R_{GOP}$; then for a picture i the allocated bits will be:

$$R_i = R_{GOP} \cdot \frac{C_i}{\sum_{j=1}^{N} C_j} \quad \text{(Eq. 1)}$$

That is, the allocated bits for each picture in this group will be proportional to the complexity index of each picture. The bit allocator 32 then outputs the allocated numbers of bits 36 as target bits to the quantization parameter calculator 33.

The third step is to decide quantization parameters (QP) for each picture and each block in the quantization parameter calculator 33, in order to achieve each picture's target bit rate which was allocated in the second step. Herein, existing rate control methods can be used, e.g. the ρ domain rate control disclosed in Zhihaj He, Sanjit K. Mitra: "A linear source model and a unified rate control algorithm for DCT Video Coding," IEEE Transactions on CSVT, vol. 12, no. 11, November 2002, or the content based distortion-driven bit allocation method in the previously mentioned EP06300184. Output of this third step is the final quantization parameters 37 of rate control for the encoding process in the encoder 34.

Thus, the present invention is based on allocating bits for each picture according to pre-analyzed complexity information 35,38, wherein the pre-analysis process 31 takes the attention-based Intra refresh into account.

In one embodiment of the invention, the attention area extraction process comprises first extracting a set of feature maps in grey level from visual input of a given image. The features include intensity, colour, orientation, etc. Then in each feature map, the most salient areas are picked out. Finally all feature maps are integrated, in a purely bottom-up manner, into a master "saliency map", which is regarded as the attention information of an image. Based on the attention saliency map, a MB/block based attention area mask can be generated to indicate which MBs/blocks in the picture are in the attention area. However, recognition of objects, e.g. faces, is never required.

In one embodiment of the invention, a value that indicates a transmission channel quality may influence the complexity index calculation of single pictures, such that for low channel quality those pictures that have Intra refresh encoded MBs within the attention area are given an additional extra amount of bits. This approach further prefers the pictures that use Intra refresh encoded attention areas, and thus leads to a higher chance of their correct transmission at very low channel quality.

In an exemplary embodiment, the Intra refresh controller can work in the following way: on picture level, select some pictures to perform Intra refresh (e.g. every 5 frames), then on block level in the selected pictures, if the blocks are in the attention area set them as Intra mode for coding, otherwise use the traditional mode decision methods (the most popular method is RDO, an improved method is end-to-end RDO) to decide Intra or Inter. In the non-selected pictures, the Intra refresh controller also performs the conventional mode decision methods. Hence, an Intra refresh map is generated by the Intra refresh controller. If the feed-back packet loss rate increases, the end-to-end RDO methods will automatically conduct Intra refresh more frequently. If the frame rate is higher, the Intra refresh period can be higher. That can be adaptive according to the real application.

In one embodiment, in the Inter/Intra predictors 43,44 and the transformer 45 of the pre-analyzer a fast motion estimation (ME) and a simple DCT are performed. There are several fast ME methods, among them a popular one being the "UMHexgonS" method proposed by Zhibo Chen and used by JVT reference software. Another possibility is a ME with lower spatial resolution. A simple DCT can be a DCT with limited amount of coefficients, e.g. a three-coefficient fast DCT.

Since according to the invention the allocated bits have considered the effect of Intra refresh schemes, the proposed rate control method can provide a relatively smooth subjective quality also when the Intra refresh mode is employed.

An advantage of the invention is that the amount of bits per picture is lower than for conventional forced Intra coding on picture level. Further, the subjective picture quality is better than for conventional Intra refresh mode, because the available bits are utilized more intelligently.

Another advantage of the invention is that the calculation complexity, and thus required processing power, is low by performing the most complex calculation, the attention area extraction, not for all pictures, but only for some selected pictures.

The invention can be used in encoders, particularly video encoders. It is particularly advantageous in cases where the encoded video is transmitted over lossy networks, where the probability of packet loss is high and thus the loss of reference frames or reference MBs would lead to visible artifacts in subsequently predicted pictures due to prediction errors. By using the invention, the available bandwidth can be optimally used to update the subjectively most important part of a picture quickly, independently from the actually available bandwidth.

The invention claimed is:
1. A method for adaptively determining a bit budget for encoding of video pictures, comprising the steps of
    selecting a group of at least three adjacent pictures and a bit budget for the selected group of pictures;

pre-analyzing each of the pictures, wherein respective predicted residuals in the frequency domain are generated;
based on the result of the pre-analysis, allocating bits to the pictures; and
encoding each of the pictures with the allocated number of bits,
wherein the step of pre-analyzing comprises the steps of
extracting attention area information on block or macroblock level for each of the pictures that shall use Intra refresh, wherein Intra refresh means forced intra coding of specified picture portions;
based on said extracted attention area information, generating for each selected picture an Intra refresh map indicating for blocks or macroblocks whether they will be Inter or Intra coded;
generating for each picture a predicted residual according to the Intra refresh map;
transforming the residuals into the frequency domain;
calculating for each of the pictures a complexity index in the frequency domain;
calculating a complexity proportion of each picture based on the complexity indices; and
allocating to each picture an amount of bits according to its complexity proportion and the bit budget of the group of pictures.

2. The method according to claim 1, wherein said complexity index is a value corresponding to the number of bits after quantization of the frequency domain residuals.

3. The method according to claim 1, wherein said complexity proportion of a particular picture is the proportion of the complexity index of the picture relative to the sum of the complexity indices of the respective group of pictures.

4. The method according to claim 1, wherein, for said step of generating a predicted residual for each picture according to the Intra refresh map, the blocks or macroblocks outside the attention area of a selected picture use a conventional mode decision process.

5. The method according to claim 1, further comprising a step of determining for each picture whether or not to use Intra refresh, wherein at least every $N^{th}$ picture is determined to use Intra refresh.

6. The method according to claim 5, wherein N depends adaptively on channel quality information, with N increasing if channel quality is better.

7. The method according to claim 5, wherein N depends on a required video frame rate.

8. The method according to claim 1, wherein the step of extracting attention area information is based on analysis of motion, luminance and colour.

9. The method according to claim 1, wherein the step of extracting attention area information is based on an analysis of temporal coherence, wherein temporal coherence comprises projecting attention area information from neighbouring selected pictures to a current selected picture.

10. The method according to claim 1, wherein said intra prediction and inter prediction includes using fast motion estimation or simplified inter or intra prediction.

11. An apparatus for adaptively determining a bit budget for encoding of video pictures, comprising
an extractor for selecting a group of at least three adjacent pictures and selecting a bit budget for the selected group of pictures;
a pre-analysis module for pre-analyzing each of the pictures, wherein respective predicted residuals in the frequency domain are generated; and
an encoder for encoding each of the pictures with the allocated number of bits,
wherein the pre-analyzer means comprises
an extractor module for extracting attention area information on block or macroblock level for each of the pictures that shall use Intra refresh, wherein Intra refresh has the meaning of forced intra coding of specified picture portions;
an Intra refresh controller for generating at least for each selected picture an Intra refresh map based on said extracted attention area information, the Intra refresh map indicating for blocks or macroblocks whether they will be Inter or Intra coded;
a predictor for generating for each picture a predicted residual according to the Intra refresh map;
a transformer for transforming the residuals into the frequency domain;
a frequency domain analyzer for calculating for each of the pictures a complexity index in the frequency domain and calculating a complexity proportion of each picture based on the complexity indices; and
a bit allocator for allocating to each picture an amount of bits according to its complexity proportion and the bit budget of the group of pictures.

12. The apparatus according to claim 11, wherein said extractor performs a conventional mode decision process for the blocks or macroblocks outside the attention area of a selected picture.

13. The apparatus according to claim 11, wherein said Intra refresh controller determines whether or not Intra refresh shall be used for a picture, wherein for at least every $N^{th}$ picture Intra refresh is determined.

14. The apparatus according to claim 11, wherein said extractor module projects attention area information from neighbouring selected pictures to a current selected picture.

15. Apparatus according to claim 11, wherein said predictor performs a fast motion estimation or simplified Inter or Intra prediction.

* * * * *